(12) United States Patent
Carlyon et al.

(10) Patent No.: US 10,302,323 B2
(45) Date of Patent: May 28, 2019

(54) BALANCING DISCHARGE AIRFLOW DURING AIR HANDLING SYSTEM OPERATION

(71) Applicant: MITEK HOLDINGS, INC., Wilmington, DE (US)

(72) Inventors: Zeke Carlyon, Vassar, MI (US); Jonathan Keinath, Millington, MI (US); Robert Paul Roth, Grand Blanc, MI (US)

(73) Assignee: MITEK HOLDINGS, INC., Wilmington, DE (US)

( * ) Notice: Subject to any disclaimer, the term of this patent is extended or adjusted under 35 U.S.C. 154(b) by 319 days.

(21) Appl. No.: 15/270,662

(22) Filed: Sep. 20, 2016

(65) Prior Publication Data

US 2018/0080670 A1    Mar. 22, 2018

(51) Int. Cl.
| | |
|---|---|
| *F24F 11/30* | (2018.01) |
| *F24F 11/62* | (2018.01) |
| *F24F 11/77* | (2018.01) |
| *F24F 7/06* | (2006.01) |
| *F24F 11/00* | (2018.01) |
| *G05B 15/02* | (2006.01) |
| *F24F 13/04* | (2006.01) |
| *F24F 11/65* | (2018.01) |

(52) U.S. Cl.
CPC ............. *F24F 11/30* (2018.01); *F24F 7/06* (2013.01); *F24F 11/0001* (2013.01); *F24F 11/62* (2018.01); *F24F 11/77* (2018.01); *F24F 13/04* (2013.01); *G05B 15/02* (2013.01); *F24F 11/65* (2018.01)

(58) Field of Classification Search
CPC .... F24F 11/30; F24F 13/04; F24F 7/06; F24F 11/0001; F24F 11/77; F24F 11/62
See application file for complete search history.

(56) References Cited

U.S. PATENT DOCUMENTS

| | | |
|---|---|---|
| 6,296,193 B1 | 10/2001 | West et al. |
| 8,849,463 B2 | 9/2014 | Hopkins et al. |
| 2004/0219875 A1* | 11/2004 | Mills ................. F24F 11/30 454/256 |
| 2005/0159845 A1* | 7/2005 | Malone .................. G06F 1/20 700/276 |
| 2009/0017173 A1* | 1/2009 | Kozman ............... G01N 33/10 426/233 |
| 2012/0224322 A1* | 9/2012 | Artman ................. G06F 1/20 361/679.48 |
| 2012/0244015 A1* | 9/2012 | Benson ............... F04D 29/601 417/53 |
| 2013/0048266 A1* | 2/2013 | Bauchot ........... H05K 7/20836 165/299 |
| 2015/0027147 A1 | 1/2015 | Cur et al. |

* cited by examiner

*Primary Examiner* — Nathan L Laughlin
(74) *Attorney, Agent, or Firm* — Stinson Leonard Street LLP (57) ABSTRACT

Monitoring airflows through fan arrays and adjusting fan speeds during air handling system operations to dynamically provide and/or maintain balanced discharge airflows. An air handling system controller utilizes fan speed and airflow data values of each fan array to determine whether a fan speed setpoint of the fans of a fan array should be increased or decreased in order to balance the airflow through each fan array. When an increase or decrease in the fan speed setpoint is required, the controller adjusts the fan speeds accordingly.

16 Claims, 5 Drawing Sheets

BALANCING DISCHARGE AIRFLOW DURING AIR HANDLING SYSTEM OPERATION

TECHNICAL FIELD

Aspects of the present disclosure generally relate to air handling systems, and more specifically, to discharge control for air handling systems having at least two fan arrays.

BACKGROUND

Air handling systems used to condition buildings or rooms typically include a unit designed to regulate, circulate, and condition air as part of the primary ventilation system of the buildings. These air handling systems often include a single intake, a mixing plenum, and two sets of ducts, each with its own set of fans, to convey the conditioned air to separate buildings or rooms. Although such a dual-discharge configuration may provide certain advantages over using two separate systems, such as efficiency and maintainability benefits, it also requires balancing the airflow discharged from the mixing plenum through the two ducts. Different configurations of the two ducts, greater restrictions in one duct relative to the other, and the like can lead to over-volume and/or under-volume conditions in the ducts. For example, balancing the discharge airflows to within a few thousand cubic feet per minute (CFM) of each other is required to maintain balanced temperature, balanced airflow over burners, and the like between the two ducts.

Conventional solutions include manually testing airflow and statically balancing the system, usually by introducing added restrictions to one of the ducts, but the system will become imbalanced as soon as the operating point and/or other parameters are changed during operation of the system. Continuing operation with the airflow imbalance leads to imbalances between the two ducts, such as imbalanced temperature, airflow over burners, and the like.

SUMMARY

Aspects of the disclosure monitor airflows through fan arrays and adjust (i.e., control) fan speeds during air handling system operation to dynamically provide and/or maintain balanced discharge airflows at all operating points, including during operating point changes.

In an aspect, an air handling system includes first and second fan arrays, first and second controllers, and a control network. The first fan array includes a fan for drawing air from a shared inlet area and expelling air into a first discharge area. The second fan array includes a fan for drawing air from the shared inlet area and expelling air into a second discharge area. The first controller is configured to monitor an airflow of the fan of the first fan array and control a fan speed of the fan of the first fan array. The second controller is configured to monitor an airflow of the fan of the second fan array and control a fan speed of the fan of the second fan array. The control network communicatively couples the first and second controllers. The first controller is also configured to monitor the fan speed and the airflow of the fan of the second fan array via the control network to balance the airflow of the fan of the first fan array with the airflow of the fan of the second fan array by adjusting the fan speed of the fan of the first array.

In another aspect, a controller includes a sensor, a processor, and a processor-readable storage device. The sensor, which is associated with a fan array of at least one fan for drawing air from a shared inlet area and expelling air into a first discharge area, includes pressure transmitters and an interface. Each pressure transmitter is configured to measure differential pressure indicative of cubic feet per minute (CFM) of the air drawn and expelled by a corresponding fan of the fan array. The interface is configured to communicatively couple the pressure transmitters to a communications network. Processor-executable instructions stored on the processor-readable storage device, when executed by the processor, configure the controller to perform monitoring and controlling operations. The controller monitors, via the communication network, a fan speed of the at least one fan of the array and CFM of the air drawn from the shared inlet area and expelled into the first discharge area by the fan array. The controller also monitors, via the communications network, CFM of air drawn from the shared inlet area and expelled into a second discharge area by a second fan array. The controller controls, via the communications network, the fan speed of the at least one fan of the fan array to balance CFM of air drawn from the shared inlet area by the fan array with CFM of air drawn from the shared inlet area by the second fan array.

In yet another aspect, a computing device includes a processor and processor-executable instructions stored on a processor-readable storage medium of the computing device. The processor-executable instructions include instructions that, when executed by the processor, monitor an airflow monitor an airflow of a first fan array and an airflow of a second fan array. The first fan array includes a fan for drawing air from an inlet area and expelling air into a first discharge area, and the second fan array includes a fan for drawing air from the inlet area and expelling air to a second discharge area. The processor-executable instructions further include instructions that, when executed by the processor, determine when the first and second fan arrays draw unbalanced volumes of air from the inlet area, and adjust a fan speed of the fan of the first fan array to balance the volumes of air drawn from the inlet area by the first and second fan arrays during their operations.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

As described herein, an airflow measurement system (e.g., pressure transmitters and/or other sensors and algorithms executing on controller computing devices) provides feedback of the actual amount of air per unit time (e.g., airflow) flowing through fan modules of two or more fan arrays. Based on this feedback, a control system (e.g., controllers)

adjust the speeds of the fan module motors, which results in the amounts of air per unit time flowing through each fan array approaching an optimal target value and becoming balanced with each other.

Figure 1:
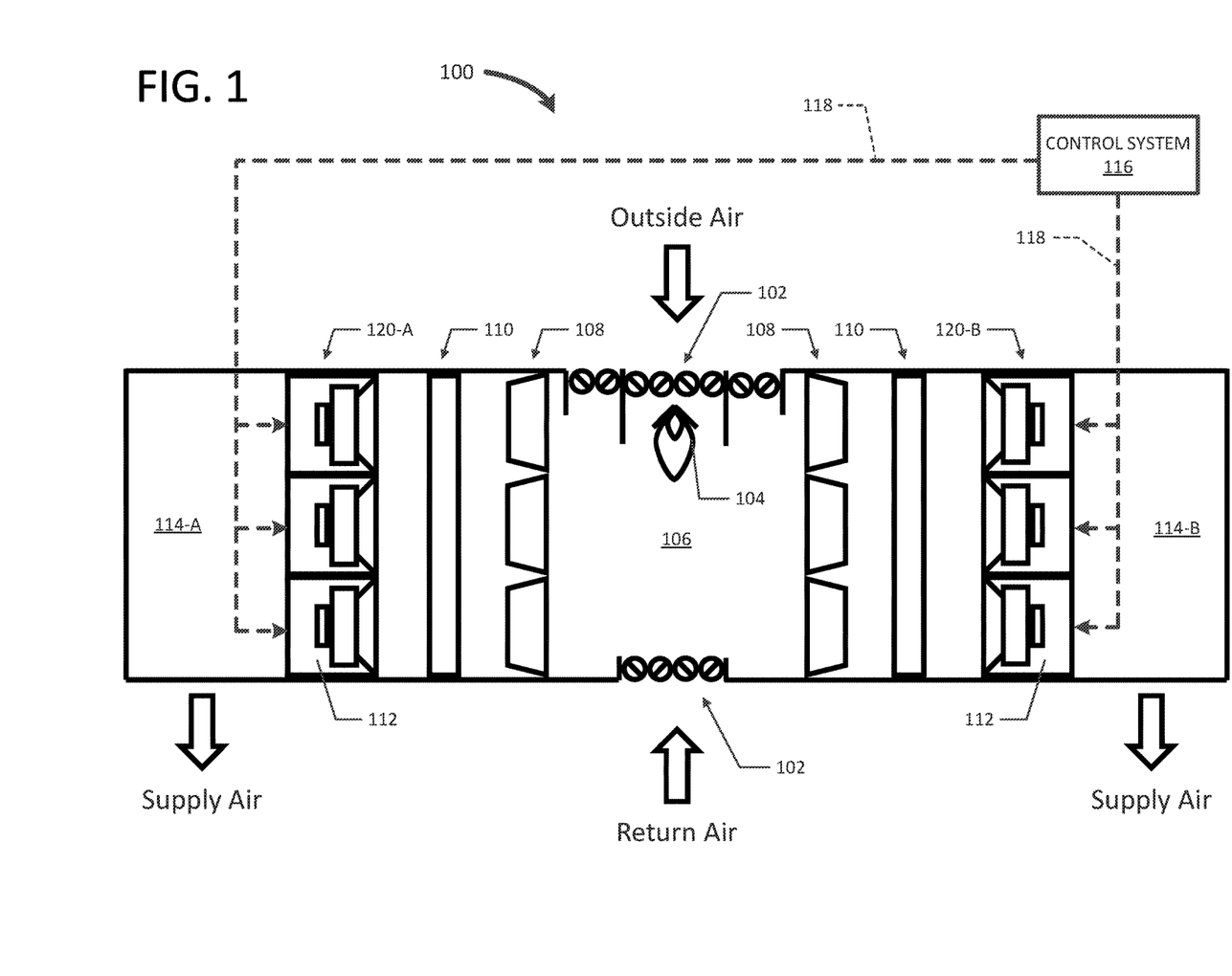
FIG. 1 is a high-level diagram illustrating an exemplary air handling system within which aspects of the disclosure may be incorporated.

FIG. 1 illustrates an exemplary air handling system, generally indicated at 100, within which aspects of the disclosure may be incorporated. The system 100 includes dampers 102, a burner 104, a mixing plenum 106, filter banks 108, cooling coils 110, fan modules 112, discharge areas 114-A, 114-B, a control system 116, and a control network 118. The control system 116 is communicatively coupled to the fan modules 112 via the control network 118, as further described herein.

As understood by one having ordinary skill in the art, fan modules 112 draw air from mixing plenum 106 (e.g., a shared inlet area), through filter banks 108 and across cooling coils 110, and expel air into their respective discharge areas 114-A, 114-B. The drawing of air from mixing plenum 106 creates a vacuum, which in turn pulls outside air and/or return air (e.g., air from inside the building or room) into mixing plenum 106. In the dual-discharge embodiment illustrated in FIG. 1, each fan module 112 comprises one of at least two fan arrays 120-A, 120-B. In an exemplary embodiment, fan arrays 120-A, 120-B may each include one to thirty-two fans. Although the illustrated embodiment includes two fan arrays, air handling systems having more than two fan arrays are within the scope of the present disclosure. Moreover, fan modules 112 of fan array 120-A may differ from fan modules of fan array 120-B.

As illustrated in FIG. 1, outside air may be pulled across the burner 104. The control system 116 may also regulate the amounts of outside air and return air pulled into mixing plenum 106 by opening, closing and/or modulating dampers 102. In an embodiment, control system 116 comprises, at least in part, a building management system (BMS), which may monitor and control mechanical and/or electrical equipment within a building, such as ventilation, lighting, power systems, security systems, and the like.

Figure 2:
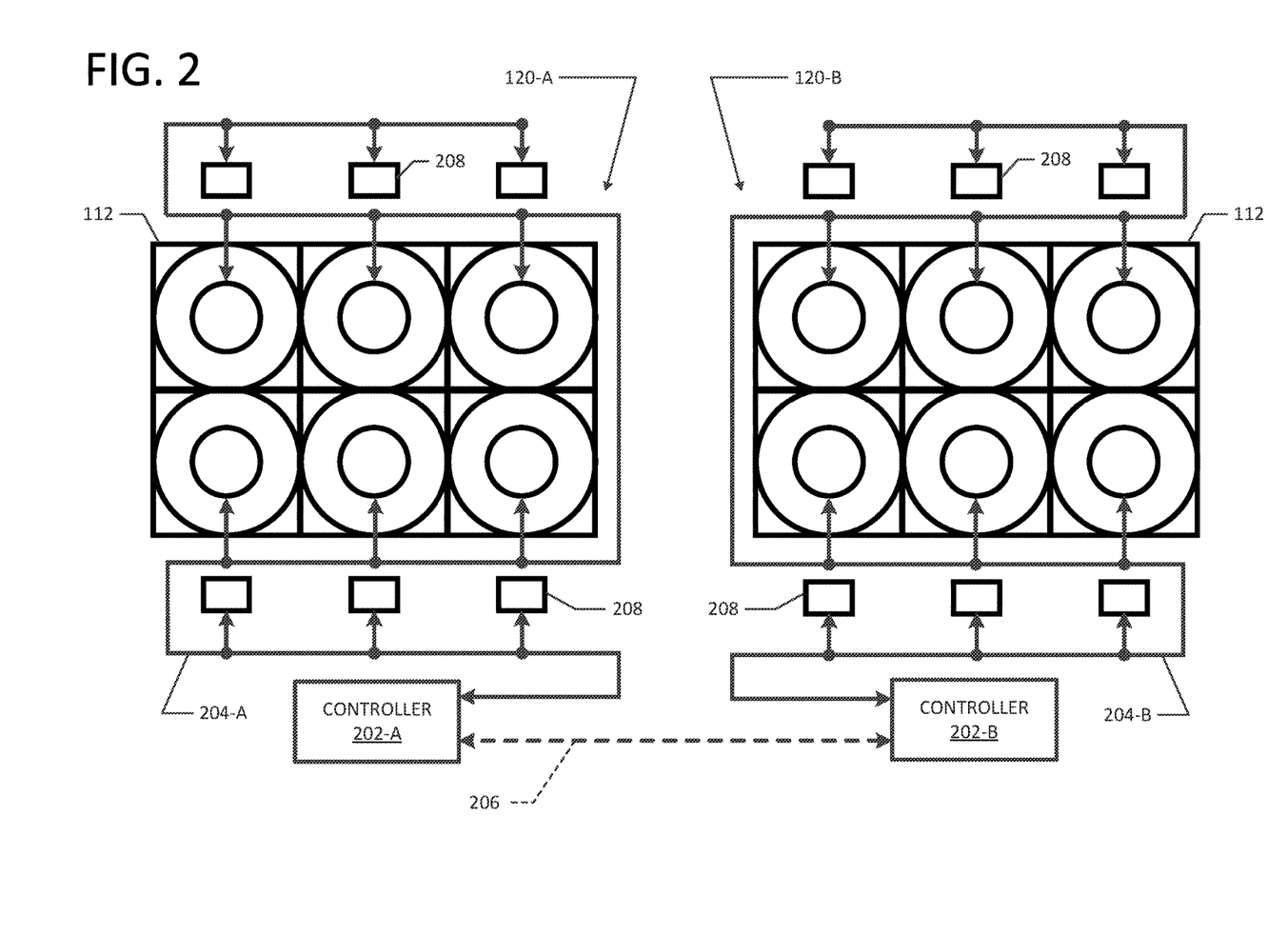
FIG. 2 is a block diagram illustrating an exemplary controller configuration according to an embodiment.

Referring now to FIG. 2, control system 116 includes a first controller 202-A, a second controller 202-B, a first communications network 204-A for first fan array 120-A, a second communications network 206, a third communications network 204-B for second fan array 120-B, and one or more pressure transmitters 208 in accordance with an embodiment of the disclosure. The first controller 202-A is communicatively coupled to fan modules 112 of the first fan array 120-A and pressure transmitters 208 associated with those fan modules via the first communications network 204-A. The second controller 202-B is communicatively coupled to fan modules 112 of the second fan array 120-B and pressure transmitters 208 associated with those fan modules via the third communications network 204-B. The first controller 202-A and second controller 202-B are communicatively coupled to each other via the second communications network 206. In accordance with one or more embodiments of the disclosure, first controller 202-A is communicatively coupled to fan modules 112 of the second fan array 120-B and pressure transmitters 208 associated with those fan modules via second communications network 206, second controller 202-B, and third communications network 204-B. Moreover, second controller 202-B is communicatively coupled to fan modules 112 of the first fan array 120-A and pressure transmitters 208 associated with those fan modules via second communications network 206, first controller 202-A, and first communications network 204-A in accordance with one or more embodiments of the disclosure.

The first controller 202-A and second controller 202-B are each adapted to measure and/or monitor a fan speed of fan modules 112 and an amount of air per unit time (e.g., airflow, cubic feet per minute (CFM)) that flows through individual fan modules 112 and/or a group of fan modules 112 (e.g., first fan array 120-A, second fan array 120-B). For example, first controller 202-A is adapted to monitor fan speeds of fan modules 112 in first fan array 120-A and airflow through those individual fan modules 112 and/or through first fan array 120-A as a whole by totaling the airflow through each individual fan module 112. Moreover, first controller 202-A is adapted to monitor fan speeds of fan modules 112 in second fan array 120-B and airflow through those individual fan modules 112 and/or through second fan array 120-B as a whole through the connection to second controller 202-B via second communications network 206. Likewise, second controller 202-B is adapted to monitor fan speeds and airflow for fan modules 112 of second fan array 120-B and/or first fan array 120-A. Additionally or alternatively, first controller 202-A and second controller 202-B are each adapted to obtain fan array airflow from an external signal, such as a duct-mounted airflow station for example.

The first controller 202-A and second controller 202-B are also each adapted to control (e.g., adjust) the fan speeds of fan modules 112 in their respective fan arrays 120-A, 120-B to balance the amount of air per unit time flowing through fan arrays 120-A, 120-B. In an exemplary and non-limiting embodiment, first controller 202-A, monitoring the fan speeds of fan modules in both fan arrays 120-A, 120-B and the airflows through both fan arrays 120-A, 120-B, determines the airflows through the fan arrays 120-A, 120-B are out of balance. For example, the airflow through second fan array 120-B may be 100,000 cubic feet per minute and the airflow through first fan array 120-A may be 30,000 cubic feet per minute. The first controller 202-A then determines whether the fan speeds of fan modules 112 in first fan array 120-A can be increased (e.g., fan modules 112 are operating below their maximum fan speed values). If the fan speeds can be increased, first controller 202-A initiates increasing the fan speeds of fan modules 112 in first fan array 120-A to result in the airflow through first fan array 120-A coming within at least a few thousand CFM (e.g., 97,000 CFM) of the airflow through second fan array 120-B. If the fan speeds cannot be increased (e.g., fan modules 112 are operating at their maximum fan speed values), first controller 202-A notifies second controller 202-B of the inability to increase fan speeds of fan modules 112 in first fan array 120-A. In response, second controller 202-B may initiate decreasing the fan speeds of fan modules 112 in second fan array 120-B to result in the airflow through second fan array 120-B coming within at least a few thousand CFM (e.g., 33,000 CFM) of the airflow through first fan array 120-A. Aspects of the airflow balance operation are further described herein.

In an embodiment, first controller 202-A and second controller 202-B each include at least one processor, at least one processor-readable storage device configured to store processor-executable instructions (e.g., random access memory (RAM), solid-state drives, etc.), a display (e.g., light-emitting diode backlit thin-film-transistor liquid-crystal display, touchscreen displays, etc.), input/output interfaces, a power supply (e.g., 24 VDC), and be housed within an enclosure (e.g., steel housing conforming to NEMA Types 1, 4, and/or 12). Exemplary inputs and outputs include, but are not limited to, control network (e.g., Modbus) interfaces, local area network (e.g., Ethernet) interfaces, digital input interfaces (e.g., "Enable" signal), digital output interfaces (e.g., "Warning" signal, "Alarm" signal), analog input terminals (e.g., 0-10 VDC, relating to required CFM), analog output terminals (e.g., 0-10 VDC, relating to provided CFM), and the like.

In accordance with one or more embodiments of the disclosure, first controller 202-A and/or second controller 202-B may be referred to as monitor panels and/or human-machine interfaces (HMIs). In yet another embodiment, first controller 202-A and second controller 202-B are each adapted to interface controllers of a BMS (e.g., control system 116) with fan modules 112 and/or pressure transmitters 208. For example, first controller 202-A and second controller 202-B may each be adapted to remove complications of controlling multiple fan modules 112 by receiving a 0-10 volt control signal from BMS controllers (i.e., appearing as a standard variable-frequency drive to BMS controllers) and in turn controlling fan modules 112 to provide a requested airflow. In the event of failure of one or more fan modules 112, first controller 202-A and second controller 202-B are adapted to provide a fault contact that can be monitored by BMS controllers. In a further embodiment, first controller 202-A and second controller 202-B are embodied as a single, central controller device adapted to monitor (e.g., read) and control (e.g., adjust) both fan arrays 120-A, 120-B.

The communications networks 204-A, 204-B, and 206 are each capable of facilitating the exchange of data among various components of system 100, including first controller 202-A, second controller 202-B, pressure transmitters 208, and fan modules 112. In a preferred embodiment, first communications network 204-A and third communications network 204-B are each a Modbus network and second communications network 206 is an Ethernet network. The second communications network 206 may further include a wide area network (WAN) that is connectable to other telecommunications networks, including other WANs or portions of the Internet or an intranet, including local area networks (LANs). The communications networks 204-A, 204-B, and 206 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications networks 204-A, 204-B, and 206 are each any medium that allows data to be physically transferred through serial or parallel communication channels (e.g., copper wire, optical fiber, computer bus, wireless communication channel, etc.). In an embodiment, first communications networks 204-A, 204-B, and 206 comprise at least in part a BMS. Although illustrated as two separate networks in the embodiment shown in FIG. 2, first communications network 204-A and third communications network 204-B may be considered as a single network in accordance with one or more embodiments of the disclosure. Similarly, communications networks 204-A, 204-B, and 206 may be considered as a single network in accordance with one or more embodiments of the disclosure.

Referring further to FIG. 2, pressure transmitters 208 are adapted to measure an air pressure differential across fan modules 112 for determining the amount of air per unit time (e.g., airflow, volumetric flow rate, CFM) that flows through fan modules 112. In another embodiment, pressure transmitters 208 receive airflow measurements from fan modules 112, which use piezo rings to measure airflow. In accordance with an aspect of the disclosure, pressure transmitters 208 are housed in sensor panels remote from the corresponding controller and mounted in or near fan arrays 120-A, 120-B. In accordance with another aspect of the disclosure, pressure transmitters 208 are housed in a control panel (e.g., first controller 202-A and/or second controller 202-B). A dedicated pressure transmitter 208 (e.g., transducer) per each fan module 112 may be utilized to measure the airflow of each individual fan module 112 in accordance with an embodiment of the disclosure. A pressure transmitter 208 may also be utilized to determine the average airflow per fan module 112, which a controller (e.g., first controller 202-A and/or second controller 202-B) can multiply by the number of operational fan modules 112 to determine the total array airflow.

Figure 3:
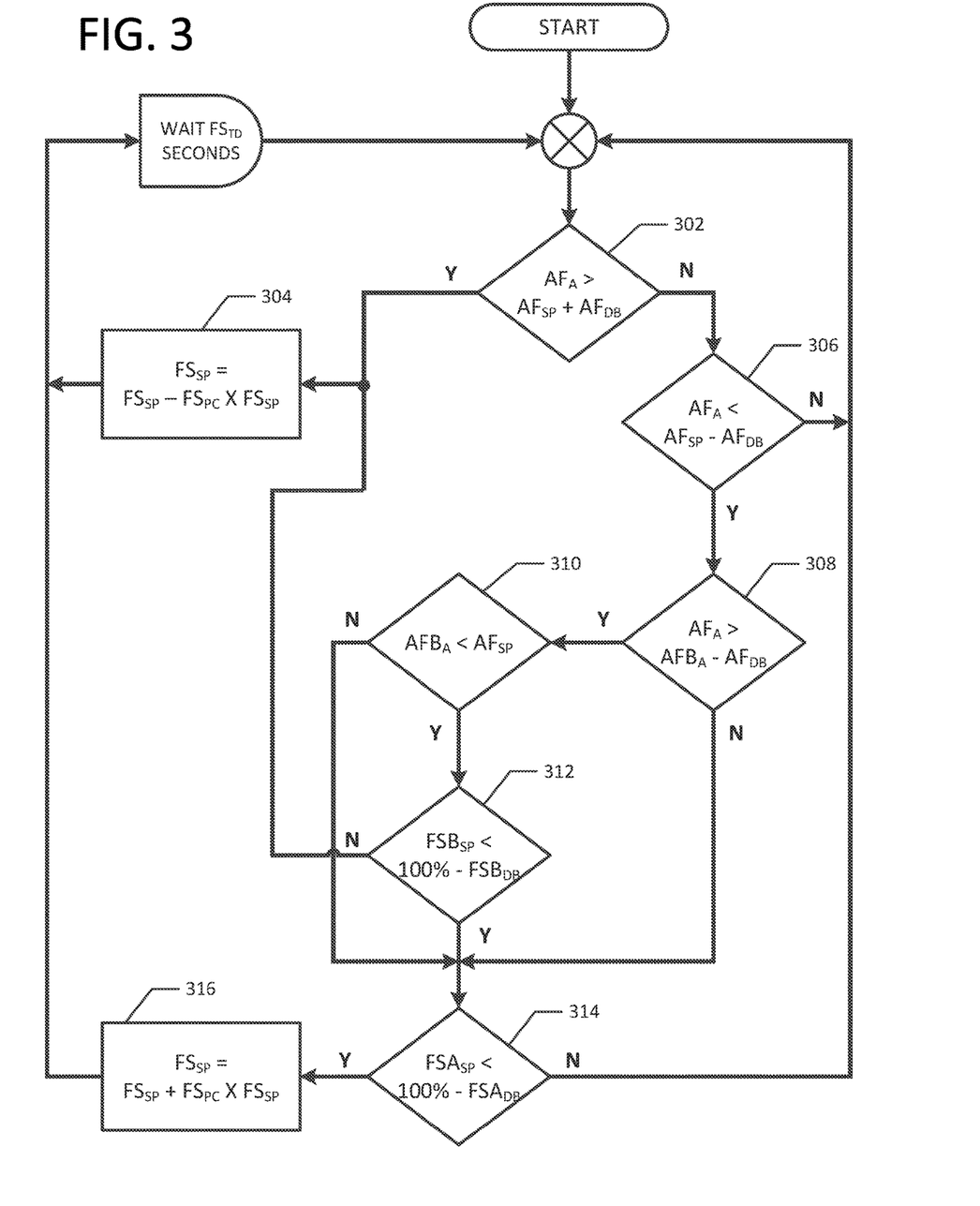
FIG. 3 illustrates an exemplary airflow balance process according to an embodiment.

FIG. 3 illustrates an exemplary airflow balance operation of first controller 202-A and/or second controller 202-B. In an embodiment, processors comprising first controller 202-A and second controller 202-B execute processor-readable instructions stored on processor-readable storage devices for performing the airflow balance operation independently of each other. For sake of brevity, the exemplary airflow balance operation will be explained below as being performed by first controller 202-A, but one having ordinary skill in the art will understand that the operation may also be performed by second controller 202-B and/or any combination of first controller 202-A and second controller 202-B. In accordance with an aspect of the disclosure, the exemplary airflow balance operation enables first controller 202-A and second controller 202-B to dynamically maintain balanced airflow through first fan array 120-A and second fan array 120-B at all operating points, including during changes of the operating point.

At step 302, first controller 202-A determines whether the value of actual (e.g., measured) airflow through first fan array 120-A ($AF_A$) is greater than the sum of an airflow setpoint ($AF_{SP}$) value and an airflow deadband ($AF_{DB}$) value. In an embodiment, the airflow setpoint is a value set by a user and/or a BMS as a target value for the amount of air per unit time that flows through fan modules 112 of first fan array 120-A. The airflow deadband is an interval surrounding the airflow setpoint such that airflow values within the deadband result in no output adjustment. As will be understood by one having ordinary skill in the art, the airflow deadband may be utilized to prevent repeated oscillation between activation and deactivation cycles (i.e., hunting). In this manner, first controller 202-A determines at 302 whether the actual airflow value is too large, as compared to the target airflow value.

Still referring to FIG. 3, when first controller 202-A determines at 302 that the actual airflow value is too large (i.e., $AF_A > AF_{SP} + AF_{DB}$), first controller 202-A proceeds to step 304 to decrease a fan speed setpoint ($FS_{SP}$) of at least one fan module 112 of first fan array 120-A. In an embodiment, first controller 202-A multiplies an adjustable percent change value ($FS_{PC}$) (e.g., 1%, 2%, 5%, etc.) by the current fan speed setpoint and then determines the difference between the resulting product and the current fan speed setpoint (i.e., $FS_{SP} = FS_{SP} - FS_{PC} \times FS_{SP}$). In an embodiment, the percent change value is less than the deadband and 5% or less to prevent a situation where first controller 202-A and second controller 202-B disagree. The first controller 202-A then transmits a control signal to at least one fan module 112 of first fan array 120-A instructing the fan module 112 to operate at the new, reduced fan speed setpoint to ultimately decrease the airflow through first fan array 120-A. After delaying for a preset and adjustable time period ($FS_{TD}$) (e.g., about 1-10 seconds), the process returns back to step 302.

When first controller 202-A determines at step 302 that the actual airflow value is not too large (i.e., $AF_A \leq AF_{SP} + AF_{DB}$), first controller 202-A determines at 306 whether the value of actual airflow through first fan array 120-A is less than the difference of the airflow setpoint value and the airflow deadband value. In this manner, first controller 202-A determines at 306 whether the actual airflow value is too small, as compared to the target airflow value. When first controller 202-A determines at 306 that the actual airflow value is not too small (i.e., $AF_A \geq AF_{SP} - AF_{DB}$), the process immediately returns to step 302. As will be understood by one having ordinary skill in the art, when the actual airflow value is neither too large nor too small, the value of airflow through first fan array 120-A is within the deadband range of the target airflow value, and thus no change in fan speed setpoint is required.

When first controller 202-A determines at 306 that the actual airflow value is too small (i.e., $AF_A < AF_{SP} - AF_{DB}$), first controller 202-A proceeds to step 308 to determine whether the value of actual airflow through first fan array 120-A ($AF_A$) is greater than the difference between the value of actual airflow through second fan array 120-B ($AFB_A$) and the airflow deadband ($AF_{DB}$) value. In this manner, first controller 202-A determines at 308 whether the actual airflow value of first fan array 120-A is at least within the lower deadband range of the actual airflow value of second fan array 120-B. When first controller 202-A determines at 308 that the actual airflow value of first fan array 120-A is less than or equal to the lower deadband range of the actual airflow value of second fan array 120-B (i.e., $AF_A \leq AFB_A - AF_{DB}$), the process continues to step 314 as further described herein.

When first controller 202-A determines at 308 that the actual airflow value of first fan array is greater than the lower deadband range of the actual airflow value of second fan array 120-B (i.e., $AF_A > AFB_A - AF_{DB}$), first controller 202-A proceeds to step 310 to determine whether the value of actual airflow through second fan array 120-B is less than the target airflow value. In this manner, first controller 202-A determines at 310 whether the actual airflow value of the second fan array 120-B is too small, as compared to the target airflow value. When first controller 202-A determines at 310 that the actual airflow value of second fan array 120-B is not too small (i.e., $AFB_A \geq AF_{SP}$), the process continues to step 314 as further described herein.

When first controller 202-A determines at 310 that the actual airflow value of second fan array 120-B is too small (i.e., $AFB_A < AF_{SP}$), first controller 202-A proceeds to step 312 to determine whether fan modules 112 of second fan array 120-B can be operated at higher fan speed values. In an embodiment, first controller 202-A determines whether a fan speed setpoint of fan modules 112 of second fan array 120-B ($FSB_{SP}$) is less than the difference between their maximum fan speed values (100%) and their fan speed deadband values ($FSB_{DB}$). In another embodiment, first controller 202-A transmits a request for this determination to second controller 202-B, which performs the determination and transmits the result back to first controller 202-A. When first controller 202-A determines at 312 that the fan modules 112 of second fan array 120-B cannot be operated at higher fan speed values (i.e., $FSB_{SP} \geq 100\% - FSB_{DB}$), the process continues to step 304 to decrease the fan speed setpoint of at least one fan module 112 of first fan array 120-A, as further described herein.

When first controller 202-A determines at 312 that the fan modules 112 of second fan array 120-B can be operated at higher fan speed values (i.e., $FSB_{SP} < 100\% - FSB_{DB}$), first controller 202-A determines at 314 whether fan modules 112 of first fan array 120-A can be operated at higher fan speed values. In an embodiment, first controller 202-A determines whether a fan speed setpoint of fan modules 112 of first fan array 120-A ($FSA_{SP}$) is less than the difference between their maximum fan speed values (100%) and their fan speed deadband values ($FSA_{DB}$). When first controller 202-A determines at 314 that the fan modules 112 of first fan array 120-A cannot be operated at higher fan speed values (i.e., $FSA_{SP} \geq 100\% - FSA_{DB}$), the process immediately returns to step 302.

When first controller 202-A determines at 314 that the fan modules 112 of first fan array 120-A can be operated at higher fan speed values (i.e., $FSA_{SP} < 100\% - FSA_{DB}$), first controller 202-A proceeds to step 316 to increase the fan speed setpoint of at least one fan module 112 of first fan array 120-A. In an embodiment, first controller 202-A multiplies the percent change value by the current fan speed setpoint and then determines the sum between the resulting product and the current fan speed setpoint (i.e., $FS_{SP} = FS_{SP} + FS_{PC} \times FS_{SP}$). The first controller 202-A then transmits a control signal to at least one fan module 112 of first fan array 120-A instructing the fan module 112 to operate at the new, increased fan speed setpoint to ultimately increase the airflow through first fan array 120-A. After delaying for the preset and adjustable time period, the process returns back to step 302.

Figure 4:
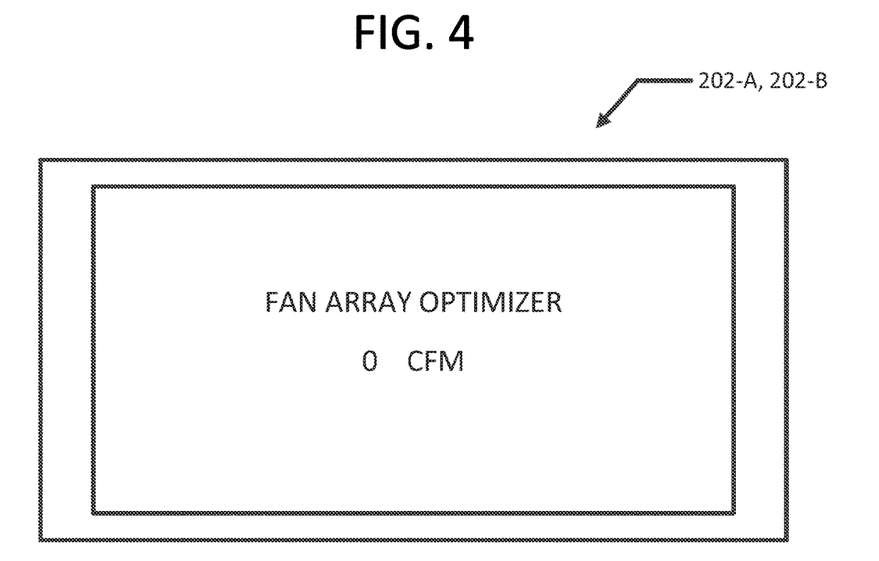
FIGS. 4 and 5 are diagrams illustrating exemplary graphical user interface displays of data values according to an embodiment.

FIG. 4 illustrates an exemplary graphical user interface (GUI) of first controller 202-A and/or second controller 202-B. In the illustrated embodiment, the GUI displays a data value representing the amount of air per unit time flowing through fan modules 112. For example, the GUI may display the airflow of all fan modules 112 of first fan array 120-A and/or second fan array 120-B combined (i.e., total array airflow). In an embodiment, the data value displayed is at least a near real-time (e.g., may also be real-time) representation of airflow through fan modules 112.

Figure 5:
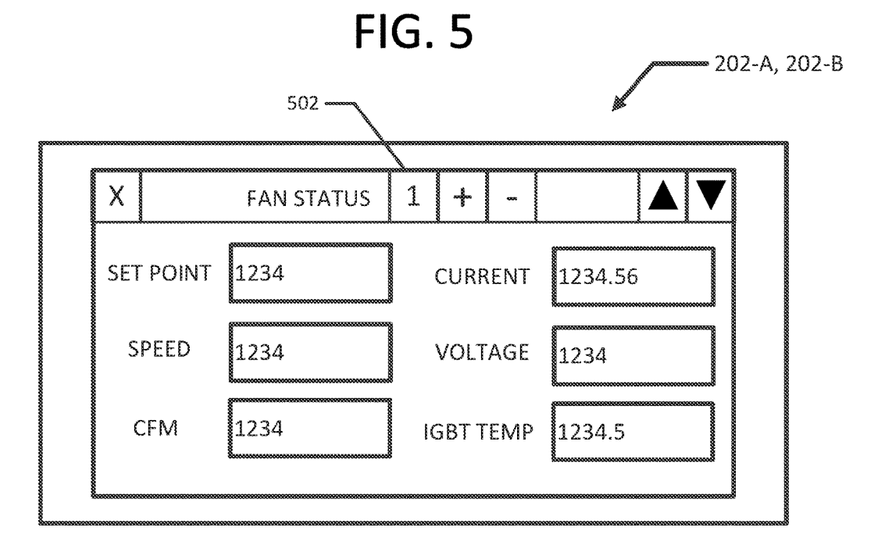

FIG. 5 illustrates another exemplary GUI of first controller 202-A and/or second controller 202-B that includes a touchscreen interface for displaying detailed operation data of individual fan modules 112. The GUI includes a fan module indicator 502, which indicates a currently selected fan about which data values are currently displayed. As illustrated, the fan module indicator 502 may be a number, but one having skill in the art will understand that other indicators that allow for identification of fan modules 112 are within the scope of the disclosure. The GUI displays current (e.g., near real-time, real-time) data values representing a fan speed setpoint (e.g., in revolutions per minute), a fan speed (e.g., in revolutions per minute), an airflow (e.g., in cubic feet per minute), an electric current (e.g., in amperes), an electric voltage (e.g., in volts), and an insulated-gate bipolar transistor (IGBT) temperature (e.g., in degrees Fahrenheit) of the fan module 112 represented by fan indicator 502.

Figure 6:
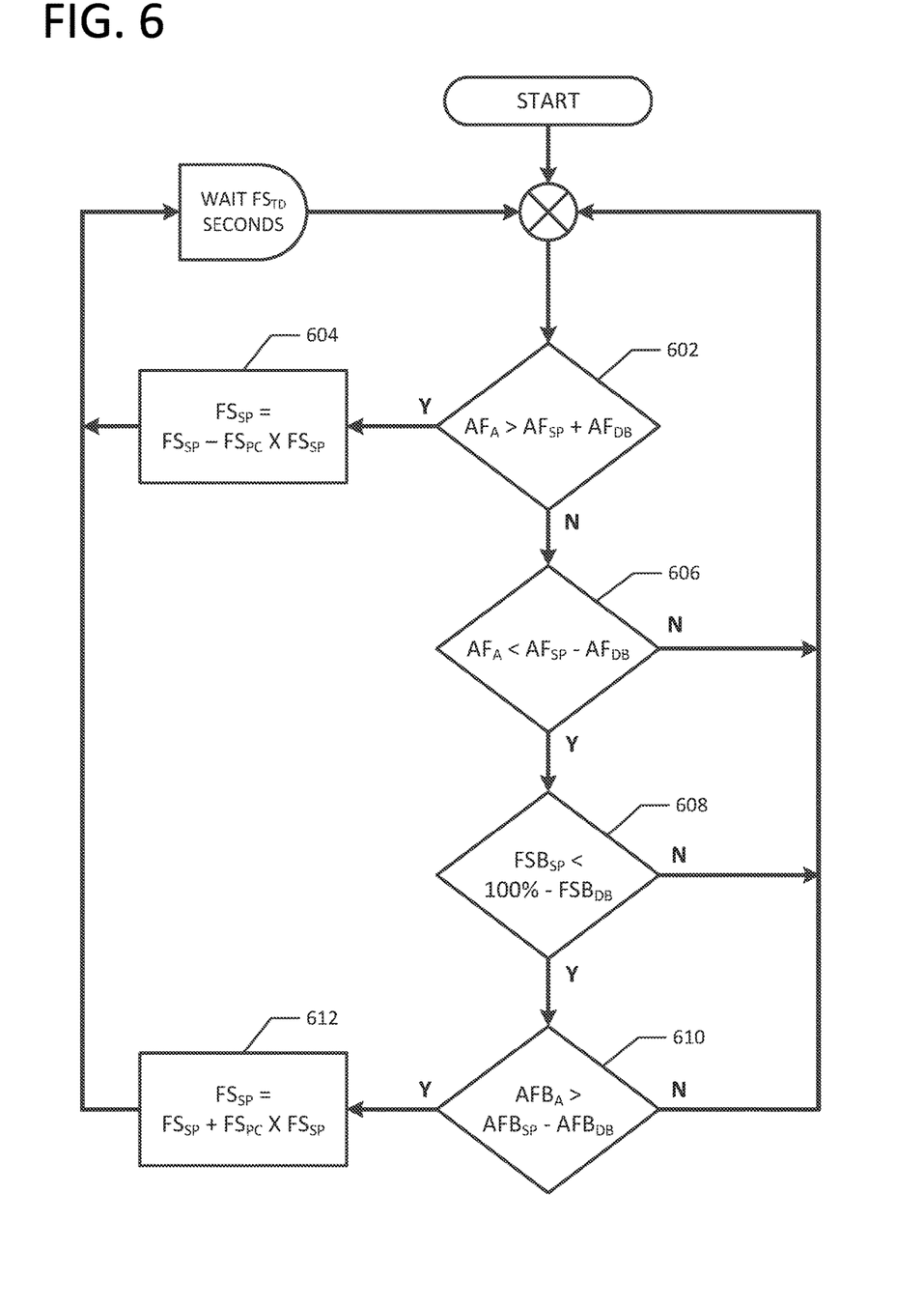
FIG. 6 illustrates another exemplary airflow balance process according to an embodiment.

FIG. 6 illustrates another exemplary airflow balance operation of first controller 202-A and/or second controller 202-B. In an embodiment, processors comprising first controller 202-A and second controller 202-B execute processor-readable instructions stored on processor-readable storage devices for performing the airflow balance operation independently of each other. For sake of brevity, the exemplary airflow balance operation will be explained below as being performed by first controller 202-A, but one having ordinary skill in the art will understand that the operation may also be performed by second controller 202-B and/or any combination of first controller 202-A and second controller 202-B. In accordance with an aspect of the disclosure, the exemplary airflow balance operation enables first controller 202-A and second controller 202-B to dynamically maintain balanced airflow through first fan array 120-A and second fan array 120-B at all operating points, including during changes of the operating point.

At step 602, first controller 202-A determines whether the value of actual (e.g., measured) airflow through first fan array 120-A ($AF_A$) is greater than the sum of an airflow setpoint ($AF_{SP}$) value and an airflow deadband ($AF_{DB}$) value. In an embodiment, the airflow setpoint is a value set by a user and/or a BMS as a target value for the amount of air per unit time that flows through fan modules 112 of first fan array 120-A. The airflow deadband is an interval surrounding the airflow setpoint such that airflow values within the deadband result in no output adjustment. As will be understood by one having ordinary skill in the art, the airflow deadband may be utilized to prevent repeated oscillation between activation and deactivation cycles (i.e., hunting). In this manner, first controller 202-A determines at 602 whether the actual airflow value is too large, as compared to the target airflow value.

Still referring to FIG. 6, when first controller 202-A determines at 602 that the actual airflow value is too large (i.e., $AF_A > AF_{SP} + AF_{DB}$), first controller 202-A proceeds to step 604 to decrease a fan speed setpoint ($FS_{SP}$) of at least one fan module 112 of first fan array 120-A. In an embodiment, first controller 202-A multiplies an adjustable percent change value ($FS_{PC}$) (e.g., 1%, 2%, 5%, etc.) by the current fan speed setpoint and then determines the difference between the resulting product and the current fan speed setpoint (i.e., $FS_{SP} = FS_{SP} - FS_{PC} \times FS_{SP}$). In an embodiment, the percent change value is less than the deadband and 5% or less to prevent a situation where first controller 202-A and second controller 202-B disagree. The first controller 202-A then transmits a control signal to at least one fan module 112 of first fan array 120-A instructing the fan module 112 to operate at the new, reduced fan speed setpoint to ultimately decrease the airflow through first fan array 120-A. After delaying for a preset and adjustable time period ($FS_{TD}$) (e.g., about 1-10 seconds), the process returns back to step 602.

When first controller 202-A determines at 602 that the actual airflow value is not too large (i.e., $AF_A \leq AF_{SP} + AF_{DB}$), first controller 202-A determines at 606 whether the value of actual airflow through first fan array 120-A is less than the difference of the airflow setpoint value and the airflow deadband value. In this manner, first controller 202-A determines at 606 whether the actual airflow value is too small, as compared to the target airflow value. When first controller 202-A determines at 606 that the actual airflow value is not too small (i.e., $AF_A \geq AF_{SP} - AF_{DB}$), the process immediately returns to step 602. As will be understood by one having ordinary skill in the art, when the actual airflow value is neither too large nor too small, the value of airflow through first fan array 120-A is within the deadband range of the target airflow value, and thus no change in fan speed setpoint is required.

When first controller 202-A determines at 606 that the actual airflow value is too small (i.e., $AF_A < AF_{SP} - AF_{DB}$), first controller 202-A proceeds to step 608 to determine whether fan modules 112 of second fan array 120-B can be operated at higher fan speed values. In an embodiment, first controller 202-A determines whether a fan speed setpoint of fan modules 112 of second fan array 120-B ($FSB_{SP}$) is less than the difference between their maximum fan speed values (100%) and their fan speed deadband values ($FSB_{DB}$). In another embodiment, first controller 202-A transmits a request for this determination to second controller 202-B, which performs the determination and transmits the result back to first controller 202-A. When first controller 202-A determines at 608 that the fan modules 112 of second fan array 120-B cannot be operated at higher fan speed values (i.e., $FSB_{SP} < 100\% - FSB_{DB}$), the process immediately returns to step 602.

When first controller 202-A determines at 608 that the fan modules 112 of second fan array 120-B can be operated at higher fan speed values (i.e., $FSB_{SP} < 100\% - FSB_{DB}$), first controller 202-A determines at 610 whether the value of actual airflow through second fan array 120-B ($AFB_A$) is greater than the difference of the airflow setpoint value of second fan array 120-B ($AFB_{SP}$) and the airflow deadband value of second fan array 120-B ($AFB_{DB}$). In this manner, first controller 202-A determines at 610 whether the value of actual airflow through second fan array 120-B at least within the deadband range of the target airflow value. Proceeding to step 610, when first controller 202-A determines that the actual airflow through second fan array 120-B is not at least within the deadband range of the target airflow value (i.e., $AFB_A \leq AFB_{SP} - AFB_{DB}$), the process immediately returns to step 602.

When first controller 202-A determines at 610 that the actual airflow through second fan array 120-B is at least within the deadband range of the target airflow value (i.e., $AFB_A > AFB_{SP} - AFB_{DB}$), first controller 202-A proceeds to step 612 to increase the fan speed setpoint of at least one fan module 112 of first fan array 120-A. In an embodiment, first controller 202-A multiplies the percent change value by the current fan speed setpoint and then determines the sum between the resulting product and the current fan speed setpoint (i.e., $FS_{SP} = FS_{SP} + FS_{PC} \times FS_{SP}$). The first controller 202-A then transmits a control signal to at least one fan module 112 of first fan array 120-A instructing the fan module 112 to operate at the new, increased fan speed setpoint to ultimately increase the airflow through first fan array 120-A. After delaying for the preset and adjustable time period, the process returns back to step 602.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An air handling system comprising:
    a first fan array coupled to a shared inlet area and a first discharge area, the first fan array comprising at least one fan for drawing air from the shared inlet area and expelling air into the first discharge area;
    a second fan array coupled to the shared inlet area and a second discharge area, the second fan array comprising at least one fan for drawing air from the shared inlet area and expelling air into the second discharge area;
    a first controller associated with the first fan array, wherein the first controller is configured to monitor an airflow of the at least one fan of the first fan array and control a fan speed thereof;
    a second controller associated with the second fan array, wherein the second controller is configured to monitor an airflow of the at least one fan of the second fan array and control a fan speed thereof; and
    a control network communicatively coupling the first controller and the second controller, wherein the first controller is configured to monitor the fan speed and the airflow of the at least one fan of the second fan array via the control network to balance the airflow of the at least one fan of the first fan array therewith by adjusting the fan speed of the at least one fan of the first fan array, and wherein the first controller comprises a processor and a processor-readable storage device configured to store processor-executable instructions comprising an algorithm to monitor the fan speed and the airflow of the at least one fan of the second fan array via the control network to balance the airflow of the at least one fan of the first fan array therewith by adjusting the fan speed of the at least one fan of the first fan array; wherein the algorithm comprises:
    decreasing a fan speed setpoint of the at least one fan of the first fan array by a predetermined percentage of the fan speed when the airflow of the at least one fan of the first fan array is greater than a sum of an airflow setpoint and an airflow deadband of the first fan array; and
    increasing the fan speed setpoint of the at least one fan of the first fan array by the predetermined percentage when:
        the airflow of the at least one fan of the first fan array is less than a difference between the airflow setpoint and the airflow deadband of the first fan array,
    at least one of:
        the airflow of the at least one fan of the first fan array is greater than a difference between an airflow of the at least one fan of the second fan array and an airflow deadband thereof,
        the airflow of the at least one fan of the second fan array is less than the airflow setpoint, and
        a fan speed of the at least one fan of the second fan array is less than a fan speed deadband thereof away from a maximum fan speed thereof, and
        a fan speed of the at least one fan of the first fan array is less than a fan speed deadband thereof away from a maximum fan speed thereof.

2. The air handling system of claim 1, wherein the second controller is configured to monitor and control the fan speed and the airflow of the at least one fan of the first fan array via the control network to balance the airflow of the at least one fan of the second fan array therewith by adjusting the fan speed of the at least one fan of the second fan array.

3. The air handling system of claim 1, further comprising a first sensor associated with the first fan array and a second sensor associated with the second fan array, wherein the first sensor is configured to transmit data indicative of the airflow of the at least one fan of the first fan array to the first controller via the control network to allow the first controller to calculate the airflow value of the first fan array, and wherein the second sensor is configured to transmit data indicative of the airflow of the at least one fan of the second fan array to the second controller via the control network to allow the second controller to calculate the airflow value of the second fan array.

4. The air handling system of claim 2, wherein the second controller comprises a processor and a processor-readable storage device configured to store processor-executable instructions comprising an algorithm to monitor the fan speed and the airflow of the at least one fan of the first fan array via the control network to balance the airflow of the at least one fan of the second fan array therewith by adjusting the fan speed of the at least one fan of the second fan array.

5. The air handling system of claim 4, wherein the algorithm comprises:
    decreasing a fan speed setpoint of the at least one fan of the second fan array by a predetermined percentage of the fan speed when the airflow of the at least one fan of the second fan array is greater than a sum of an airflow setpoint and an airflow deadband of the second fan array; and
    increasing the fan speed setpoint of the at least one fan of the second fan array by the predetermined percentage when:
        the airflow of the at least one fan of the second fan array is less than a difference between the airflow setpoint and the airflow deadband of the second fan array,
    at least one of:
        the airflow of the at least one fan of the second fan array is greater than a difference between an airflow of the at least one fan of the first fan array and an airflow deadband thereof,
the airflow of the at least one fan of the first fan array is less than the airflow setpoint, and
a fan speed of the at least one fan of the first fan array is less than a fan speed deadband thereof away from a maximum fan speed thereof, and
a fan speed of the at least one fan of the second fan array is less than a fan speed deadband thereof away from a maximum fan speed thereof.

6. The air handling system of claim 1, wherein the first controller is configured to receive a target airflow value and, in response thereto, adjust the fan speed of the at least one fan of the first fan array until the airflow thereof is within a deadband range of the received target airflow value.

7. A controller comprising:
a first sensor associated with a first fan array, wherein the first fan array has one or more fans for drawing air from a shared inlet area and expelling air into a first discharge area, the sensor comprising:
one or more pressure transmitters, wherein each pressure transmitter is configured to measure differential pressure indicative of cubic feet per minute (CFM) of the air drawn and expelled by at least one corresponding fan of the first fan array, and
an interface configured to communicatively couple the pressure transmitters of the first sensor to a communications network;
the controller further comprising:
a processor; and
a processor-readable storage device configured to store processor-executable instructions that, when executed by the processor, configure the controller to:
monitor, via the communications network, a fan speed of the at least one fan of the first fan array;
monitor, via the communications network, CFM of the air drawn from the shared inlet area and expelled into the first discharge area by the first fan array;
monitor, via the communications network, CFM of air drawn from the shared inlet area and expelled into a second discharge area by a second fan array; and
control, via the communications network, the fan speed of the at least one fan of the first fan array to balance CFM of air drawn from the shared inlet area by the first fan array with CFM of air drawn from the shared inlet area by the second fan array and to adjust the fan speed of the at least one fan of the first fan array by:
decreasing a fan speed setpoint of the at least one fan of the first fan array by a predetermined percentage of the fan speed when the measured CFM of the first fan array is greater than the CFM setpoint; and
increasing the fan speed setpoint of the at least one fan of the first fan array by the predetermined percentage when:
the measured CFM of the first fan array is less than the CFM setpoint,
at least one of:
the measured CFM of the first fan array is greater than the measured CFM of the second fan array,
the measured CFM of the second fan array is less than the CFM setpoint, and a fan speed of the at least one fan of the second fan array is less than a maximum fan speed thereof, and
a fan speed of the at least one fan of the first fan array is less than a maximum fan speed thereof.

8. The controller of claim 7, further comprising:
a second sensor associated with the second fan array, the second sensor comprising:
one or more pressure transmitters, wherein each pressure transmitter is configured to measure differential pressure indicative of CFM of the air drawn and expelled by at least one corresponding fan of the second fan array, and
an interface configured to communicatively couple the pressure transmitters of the second sensor to the communications network,
wherein the processor-executable instructions include instructions that, when executed by the processor, configure the controller to:
monitor, via the communications network, a fan speed of the at least one fan of the second fan array;
monitor, via the communications network, CFM of the air drawn from the inlet area and expelled into the second discharge area by the second fan array;
monitor, via the communications network, CFM of the air drawn from the inlet area and expelled into the first discharge area by the first fan array; and
control, via the communications network, the fan speed of the at least one fan of the second fan array to balance CFM of air drawn from the inlet area by the second fan array with CFM of air drawn from the inlet area by the first fan array.

9. The controller of claim 7, wherein the processor-readable storage device is configured to store processor-executable instructions that, when executed by the processor, configure the controller to receive a control signal from a building management system, said control signal comprising a requested CFM of air to be expelled into the first discharge area.

10. The controller of claim 7, further comprising a human-machine interface display configured to display at least one of:
a fan speed,
a fan speed setpoint,
the CFM of the air drawn from the inlet area and expelled into the first discharge area by the first fan array,
an electrical current,
an electrical voltage, and
a temperature of an insulated-gate bipolar transistor.

11. The controller of claim 7, wherein each pressure transmitter is configured to transmit the measured pressure differential indicative of CFM to the processor via the communications network.

12. The controller of claim 7, wherein the processor-readable storage device is configured to store processor-executable instructions that, when executed by the processor, configure the controller to receive a target airflow value and, in response to said receiving, adjust, via the first communications network, the fan speed of the at least one fan of the first fan array until the CFM of air drawn from the inlet area thereby is within a deadband range of the received target airflow value.

13. A computing device comprising:
a processor;

a processor-readable storage device having processor-executable instructions stored thereon including instructions that, when executed by the processor:
monitor an airflow of a first fan array comprised of at least one fan for drawing air from a shared inlet area and expelling air into a first discharge area;
monitor an airflow of a second fan array comprised of at least one fan for drawing air from the inlet area and expelling air into a second discharge area;
determine when the first and second fan arrays draw unbalanced volumes of air from the inlet area; and
adjust a fan speed of the at least one fan of the first fan array to balance the volumes of air drawn from the inlet area by the first and second fan arrays during operations thereof by:
decreasing a fan speed setpoint of the at least one fan of the first fan array by a predetermined percentage of the fan speed when the airflow of the at least one fan of the first fan array is greater than an airflow setpoint of the first fan array; and
increasing the fan speed setpoint of the at least one fan of the first fan array by the predetermined percentage when:
the airflow of the at least one fan of the first fan array is less than the airflow setpoint,
at least one of:
the airflow of the at least one fan of the first fan array is greater than the airflow of the at least one fan of the second fan array,
the airflow of the at least one fan of the second fan array is less than the airflow setpoint, and
the fan speed of the at least one fan of the second fan array is less than a maximum speed thereof, and
the fan speed of the at least one fan of the first fan array is less than a maximum speed thereof.

14. The computing device of claim 13, wherein the processor-readable storage device has processor-executable instructions stored thereon that, when executed by the processor:
control a fan speed of the at least one fan of the first fan array; and
control a fan speed of the at least one fan of the second fan array.

15. The computing device of claim 14, wherein the processor-readable storage device has processor-executable instructions stored thereon that, when executed by the processor, communicate at least one of the airflow of the first fan array and the fan speed of the at least one fan of the first fan array to a second computing device associated with the second fan array via a communications network to balance the volumes of air drawn from the inlet area by the first and second fan arrays during operations thereof.

16. The computing device of claim 13, wherein the processor-readable storage device has processor-executable instructions stored thereon that, when executed by the processor:
receive a target airflow value; and
adjust, in response to receiving the target value, the fan speed of the at least one fan of the first fan array until the airflow thereof is within a deadband range of the received target airflow value.

* * * * *